UNITED STATES PATENT OFFICE.

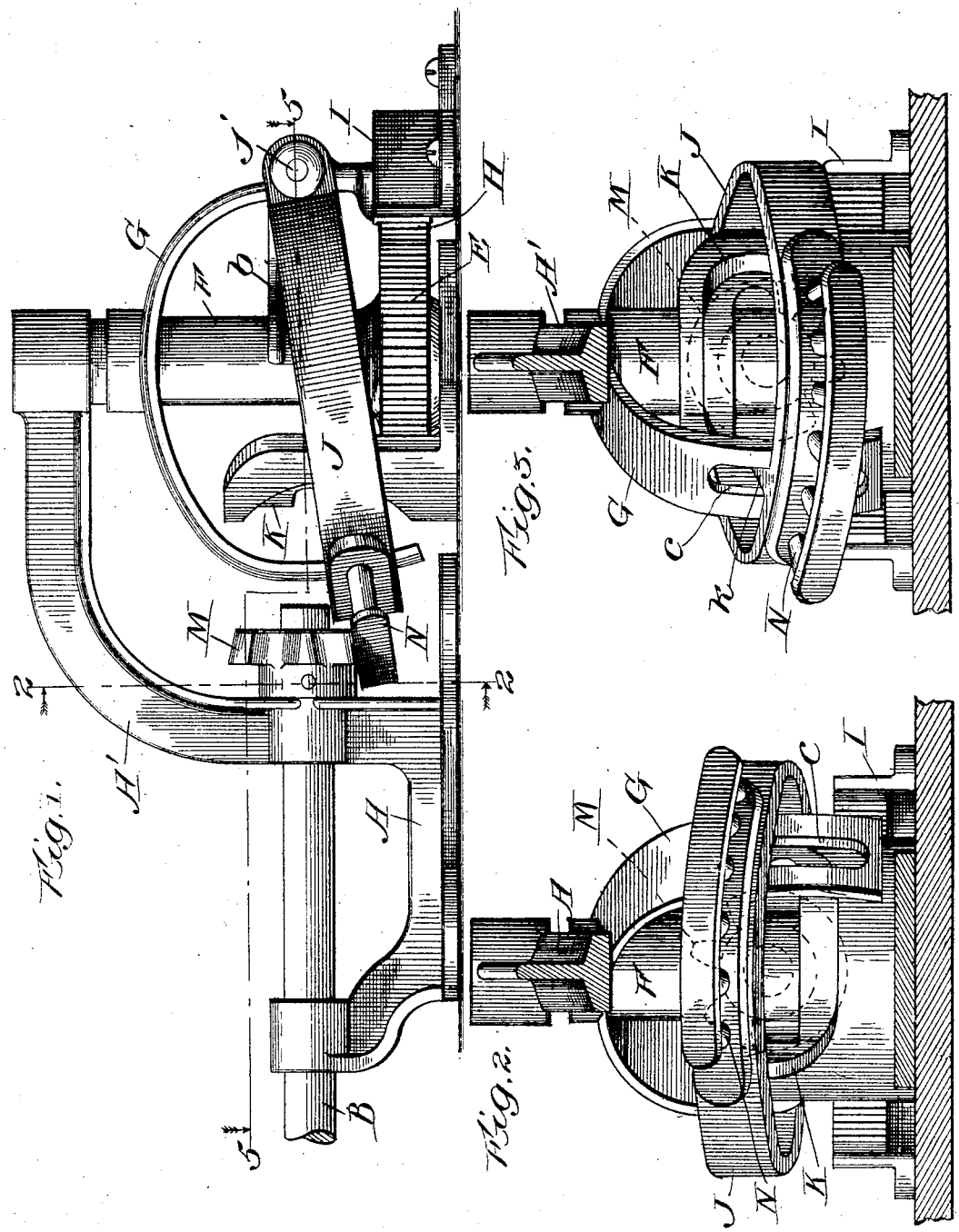

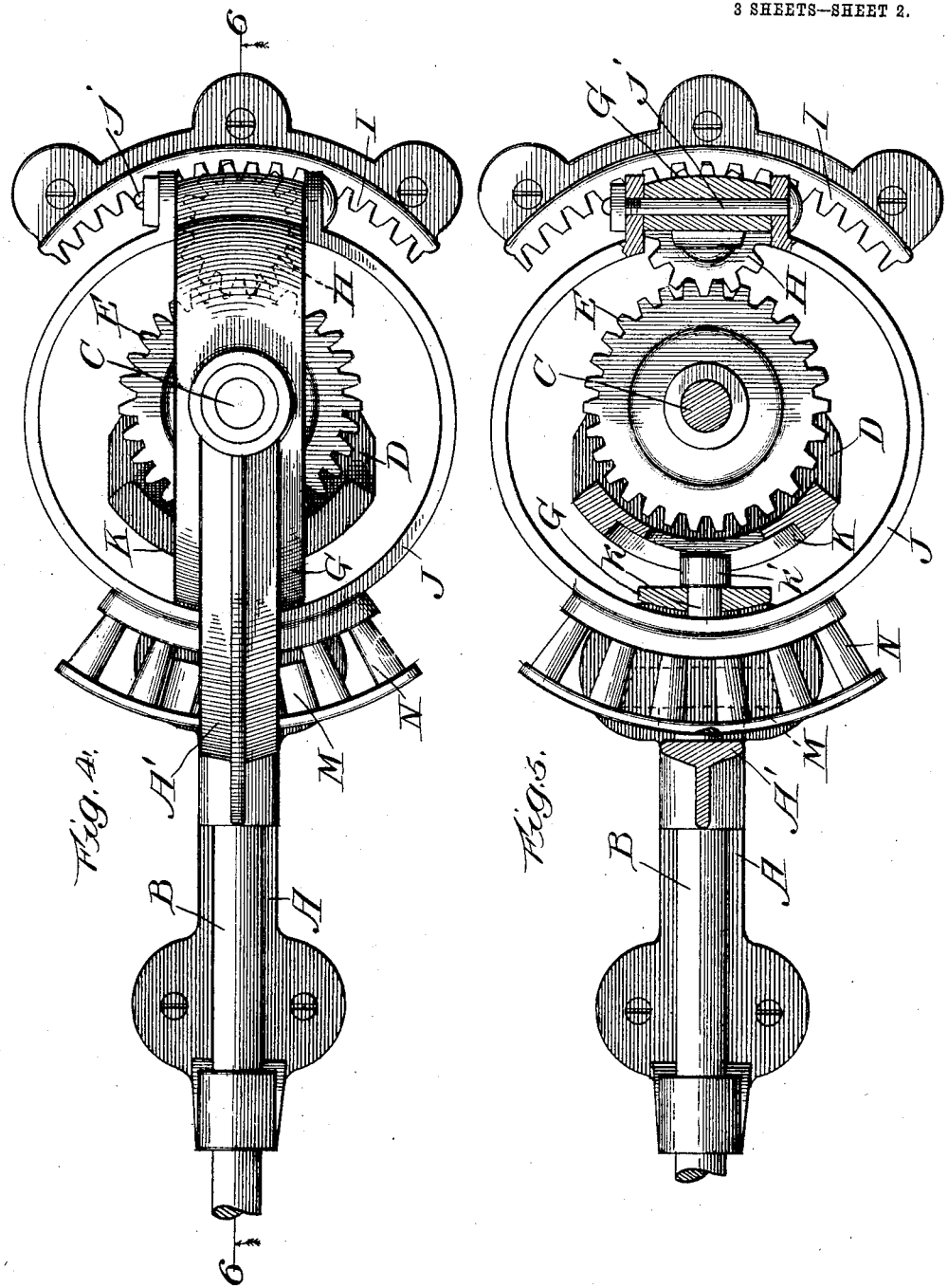

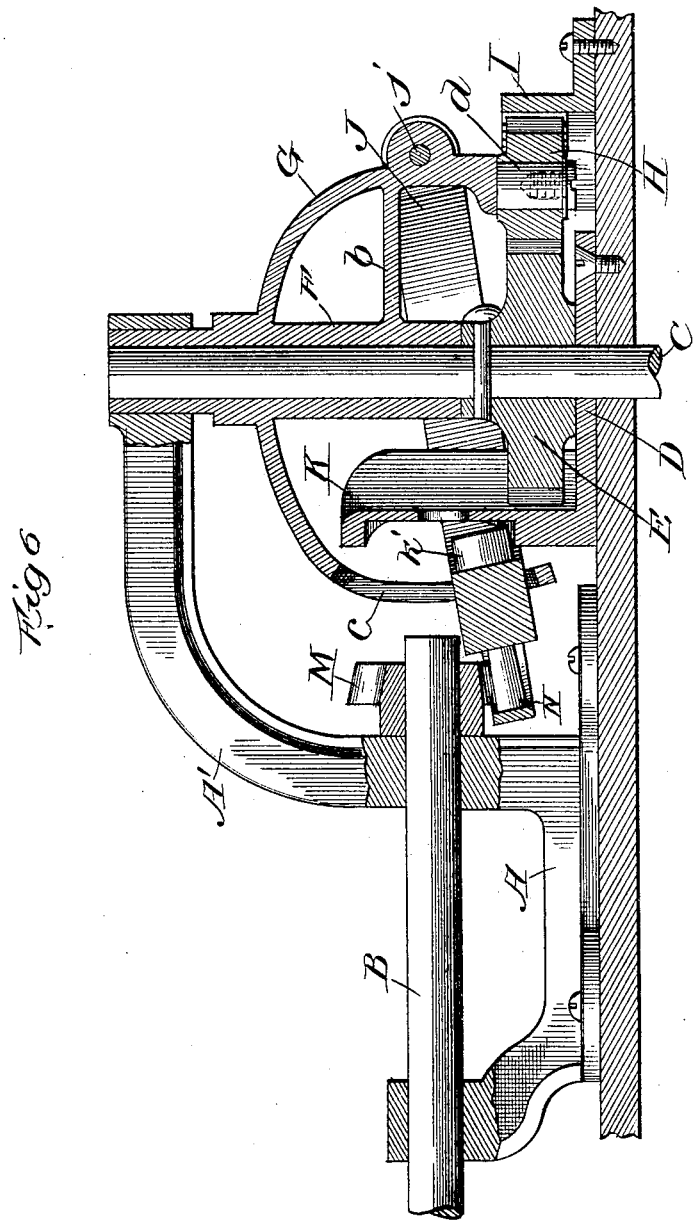

WILLIAM H. VOSS, OF DAVENPORT, IOWA.

MECHANICAL MOVEMENT.

No. 803,455.          Specification of Letters Patent.          Patented Oct. 31, 1905.

Application filed August 3, 1905. Serial No. 272,539.

*To all whom it may concern:*

Be it known that I, WILLIAM H. VOSS, a citizen of the United States, and a resident of Davenport, in the county of Scott and State of Iowa, have invented certain new and useful Improvements in Mechanical Movements, of which the following is a full, clear, and exact description.

The object of my invention is to provide improved mechanism for converting a continuous rotary motion into a rotary reciprocal movement which is especially adapted for use in washing-machines and can be operated easily with a minimum expenditure of effort and greatly multiply the power applied thereto. This I accomplish by the means hereinafter fully described, and as particularly pointed out in the claims.

In the drawings, Figure 1 is a side elevation of my invention. Fig. 2 is a vertical transverse section taken on dotted line 2 2, Fig. 1, showing the annulus in one position. Fig. 3 is a similar view showing the annulus in the opposite position. Fig. 4 is a plan view of my improved mechanism. Fig. 5 is a horizontal section thereof taken on dotted line 5 5, Fig. 1. Fig. 6 is a longitudinal central section of the same.

Referring to the drawings, A represents a suitable supporting-frame, which is provided with bearings for the continuously-rotating drive-shaft B and with a gooseneck A', arising from one of said bearings and extending in the same direction as said drive-shaft.

C represents the rotary reciprocal shaft, arranged at right angles to the drive-shaft, which has its upper end journaled in bearings in the overhanging end of said gooseneck and its lower portion in suitable bearings D in the base-plate or cover, on which said supporting-frame is mounted. Just above bearings D a gear E is secured to shaft C, and between this gear and the gooseneck a sleeve F is loosely mounted on said shaft C, the upper end of which may, if desired, enter the bearings in the end of the gooseneck and surround and journal the upper end of the said shaft. At a certain point above gear E sleeve F has an arm $b$ projecting therefrom in a direction opposite to the adjacent end of the drive-shaft, which has an inverted-horseshoe-shaped frame G secured to or made integrant therewith, the center of length of which strikes through and merges into the sleeve F. The pendent portion of the branch of frame G nearest the drive-shaft is provided with a vertically-elongated guide-slot $c$, and the opposite extremity of frame G has a pendent stud $d$, on which an idle pinion H is loosely journaled. This pinion H meshes with gear E on one side and with a concaved segmental stationary rack I on the opposite side, which is concentric and is struck from the center of shaft C and is suitably secured to the bed-plate or cover, to which said supporting-frame is attached. Motion is imparted to gear E through pinion H as the latter is carried first in one direction and then the other by frame G. In order to impart the proper reciprocal movement to frame G, I pivot to the leg of frame G farthest from the drive-shaft the hinged annulus J, the said frame having a transverse knuckle on its outer surface just below the plane of arm $b$, to the ends of which the pivotal lugs of annulus J are pivoted by a pivot-bolt $j$. Diametrically opposite its pivot annulus J has a stud $k$ projecting inward from it that extends through the guide-slot $c$ and has an antifriction-roller $k'$ journaled on a pin extending therefrom. This antifriction-roller engages an internal elliptical track or cam K, the curvature of the wall in which said cam is made being struck from the center of shaft C and the major axis of said ellipse being horizontal. This track is preferably cast in one piece with the basal flange of the bearings D, and it is arranged transverse to the vertical plane of the drive-shaft, by which it is intersected midway its length.

The side of the annulus opposite stud $k$ is provided with a segmental rack N, consisting of a series of equidistant studs whose outer ends are connected by a segmental rim, and this rack is engaged first on one side and then the other by a pinion M on the adjacent end of the drive-shaft.

The proportions and dimensions of the cam K, the slot $c$, and the rack N and their cooperative relation are such that rack N is always in engagement with pinion M, and when by virtue of said engagement the annulus moves to the limit of its movement in one direction the pinion engages the end stud of rack N and raises or lowers the said rack and annulus, according to the direction said annulus last moved in, and gets under and engages the under side of the rack, thus moving the annulus in one direction, or gets above the rack and moves the annulus in the opposite direction. The movement of the annulus is imparted through the horseshoe-frame G and pinion H to the gear E and shaft C, which rotates first in one direction and then the other.

What I claim as new is—

1. A mechanical movement comprising a rotary reciprocal shaft, a gear on said shaft, a stationary segmental rack concentric with said shaft, an idle wheel interposed between and engaging said gear and rack, rotary reciprocal means for carrying said idle pinion, and a continuously-revolving shaft operatively connected to said means.

2. A mechanical movement comprising a rotary reciprocal shaft, a gear on said shaft, a stationary segmental rack concentric with said shaft, an idle wheel interposed between and engaging said gear and rack, and means for moving said pinion bodily back and forth in a segmental path concentric to said shaft.

3. A mechanical movement comprising a rotary reciprocal shaft, a gear on said shaft, a stationary segmental rack concentric with said shaft, an idle wheel interposed between and engaging said gear and rack, a rotary reciprocal frame loosely journaled on said rotary reciprocal shaft and carrying said idle pinion, and a continuously-revolving shaft operatively connected to said frame.

4. A mechanical movement comprising a rotary reciprocal shaft, a rotary reciprocal frame loosely journaled on said shaft, a continuously-revolving shaft operatively connected to said frame, and means for imparting the motion of said frame to said rotary reciprocal shaft.

5. A mechanical movement comprising a rotary reciprocal shaft a rotary reciprocal frame loosely journaled on said shaft, a segmental rack pivotally connected to said frame and adapted to move both concentric with and substantially parallel to the axis of said rotary reciprocal shaft, a continuously-revolving shaft operatively connected to said rack, and means for imparting the motion of said frame to said rotary reciprocal shaft.

6. A mechanical movement comprising a rotary reciprocal shaft, a rotary reciprocal frame loosely journaled on said shaft, a segmental rack carried by said frame, a continuously-revolving shaft engaging said rack and means operatively connecting said frame and rotary reciprocal shaft.

7. A mechanical movement comprising a rotary reciprocal shaft, a rotary reciprocal frame loosely journaled on said shaft, a continuously-revolving shaft operatively connected to said frame, a gear on said shaft, a stationary segmental rack concentric with said rotary reciprocal shaft, an idle wheel connected to said frame and interposed between and engaging said gear and rack.

8. A mechanical movement comprising a rotary reciprocal shaft a rotary reciprocal frame loosely journaled on said shaft, a segmental rack pivotally connected to said frame and adapted to move both concentric with and substantially parallel to the axis of said rotary reciprocal shaft, a continuously-revolving shaft operatively connected to said rack, a gear on said rotary reciprocal shaft, a stationary segmental rack concentric with said shaft, an idle wheel connected to said frame and interposed between and engaging said gear and rack.

9. A mechanical movement comprising a rotary reciprocal shaft, a rotary reciprocal frame loosely journaled on said shaft, a segmental rack carried by said frame, a continuously-revolving shaft engaging said rack, a gear on said rotary reciprocal shaft, a stationary segmental rack concentric with said shaft, an idle wheel connected to said frame and interposed between and engaging said gear and rack.

10. A mechanical movement comprising a rotary reciprocal shaft, a rotary reciprocal frame loosely journaled on said shaft having an arm projecting therefrom, an annulus the ends of which are pivotally connected to said arm and provided opposite its pivot with a segmental rack, a continuously-revolving shaft, a pinion thereon engaging said rack, devices which in conjunction with said pinion raise or lower said rack at the end of its movement, and means for operatively connecting said frame and the rotary reciprocal shaft.

11. A mechanical movement comprising a rotary reciprocal shaft, a rotary reciprocal frame loosely journaled on said shaft, a segmental rack pivotally connected thereto and supported thereby, a stationary guiding device engaged by said rack at the end of its transverse movement, a continuously-revolving shaft, a pinion on said shaft engaging said rack, and means operatively connecting said frame to said rotary reciprocal shaft.

12. A mechanical movement comprising a rotary reciprocal shaft, a rotary reciprocal frame loosely journaled on said shaft, an annulus pivotally connected to said frame, a segmental rack supported by said annulus opposite its pivot having an inwardly-projecting stud, a stationary guiding device engaged by said stud at the end of each throw of the said segmental rack, a continuously-revolving shaft, a pinion on said shaft engaging said rack and means for operatively connecting said frame to said rotary reciprocal shaft.

13. A mechanical movement comprising a rotary reciprocal shaft, an inverted-horseshoe-shaped frame loosely journaled on said shaft, one end of which is provided with a longitudinally-elongated slot therein, an annulus pivotally connected to the opposite end of said frame, a segmental rack secured to and projecting from said annulus opposite its pivot, a stud projecting inward from said annulus opposite its pivot which extends through said slot, a continuously-revolving shaft, a pinion on said shaft engaging said rack, and means for imparting the motion of said frame to said rotary reciprocal shaft.

14. A mechanical movement comprising a rotary reciprocal shaft, an inverted-horseshoe-shaped frame loosely journaled on said shaft one end of which is provided with a longitudinally-elongated slot, an annulus pivotally connected to the opposite end of said frame, a stud projecting inward from said annulus opposite its pivot and extending through said slot, a stationary cam engaged by the inner end of said stud, a segmental rack carried by said annulus, a continuously-revolving shaft, a pinion thereon engaging said rack and means for operatively connecting said frame to said rotary reciprocal shaft.

15. A mechanical movement comprising a rotary reciprocal shaft, a rotary reciprocal frame loosely journaled on said shaft having an arm projecting therefrom, an annulus the ends of which are pivotally connected to said arm and provided opposite its pivot with a segmental rack, a continuously-revolving shaft, a pinion thereon engaging said rack, devices which in conjunction with said pinion raise or lower said rack at the end of its movement, a gear on said rotary reciprocal shaft, a stationary segmental rack concentric therewith, an idle wheel suitably connected to and carried by said frame and interposed between and engaging said gear and rack.

16. A mechanical movement comprising a rotary reciprocal shaft, a rotary reciprocal frame loosely journaled on said shaft, a segmental rack pivotally connected thereto and supported thereby, a stationary guiding device engaged by said rack at the end of its transverse movement, a continuously-revolving shaft, a pinion on said shaft engaging said rack, a gear on said rotary reciprocal shaft, a stationary segmental rack concentric therewith, an idle wheel suitably connected to and carried by said frame and interposed between and engaging said gear and rack.

17. A mechanical movement comprising a rotary reciprocal shaft, a rotary reciprocal frame loosely journaled on said shaft, an annulus pivotally connected to said frame, a segmental rack supported by said annulus opposite its pivot having an inwardly-projecting stud, a stationary guiding device engaged by said stud at the end of each throw of the said segmental rack, a continuously-revolving shaft, a pinion on said shaft engaging said rack, a gear on said rotary reciprocal shaft, a stationary segmental rack concentric therewith, an idle wheel suitably connected to and carried by said frame and interposed between and engaging said gear and rack.

18. A mechanical movement comprising a rotary reciprocal shaft, an inverted-horseshoe-shaped frame loosely journaled on said shaft, one end of which is provided with a longitudinally-elongated slot therein, an annulus pivotally connected to the opposite end of said frame, a segmental rack secured to and projecting from said annulus opposite its pivot, a stud projecting inward from said annulus opposite its pivot which extends through said slot, a continuously-revolving shaft, a pinion on said shaft engaging said rack, a gear on said rotary reciprocal shaft, a stationary segmental rack concentric therewith, an idle wheel suitably connected to and carried by said frame and interposed between and engaging said gear and rack.

19. A mechanical movement comprising a rotary reciprocal shaft, an inverted-horseshoe-shaped frame loosely journaled on said shaft one end of which is provided with a longitudinally-elongated slot, an annulus pivotally connected to the opposite end of said frame, a stud projecting inward from said annulus opposite its pivot and extending through said slot, a stationary cam engaged by the inner end of said stud, a segmental rack carried by said annulus, a continuously-revolving shaft, a pinion thereon engaging said rack, a gear on said rotary reciprocal shaft, a stationary segmental rack concentric therewith, an idle wheel suitably connected to and carried by said frame and interposed between and engaging said gear and rack.

In testimony whereof I have hereunto set my hand this 21st day of July, A. D. 1905.

WILLIAM H. VOSS.

Witnesses:
WILLIAM E. PULS,
CHAS. E. MEARNS.